United States Patent
Murnane (10) Patent No.: US 10,374,409 B2
(45) Date of Patent: Aug. 6, 2019

(54) METHOD OF DETECTING ARC EVENTS IN A POWER SYSTEM, AND A POWER SYSTEM INCLUDING AN ARC DETECTOR

(71) Applicant: Analog Devices Global, Hamilton (BM)

(72) Inventor: Martin Murnane, County Limerick (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/397,389

(22) Filed: Jan. 3, 2017

(65) Prior Publication Data

US 2018/0115144 A1 Apr. 26, 2018

(30) Foreign Application Priority Data

Oct. 21, 2016 (GB) .................. 1617809.7

(51) Int. Cl.
| | |
|---|---|
| *H02H 1/00* | (2006.01) |
| *H02S 50/00* | (2014.01) |
| *H02S 40/32* | (2014.01) |
| *H02S 50/10* | (2014.01) |
| *H02S 10/00* | (2014.01) |

(52) U.S. Cl.
CPC .......... *H02H 1/0015* (2013.01); *H02S 10/00* (2013.01); *H02S 40/32* (2014.12); *H02S 50/00* (2013.01); *H02S 50/10* (2014.12); *Y02E 10/56* (2013.01)

(58) Field of Classification Search
CPC ....... H02H 1/0015; H02S 50/10; H02S 10/00; H02S 40/32
See application file for complete search history.

(56) References Cited

U.S. PATENT DOCUMENTS

| | | | |
|---|---|---|---|
| 8,929,038 B2 * | 1/2015 | Strobl .................. | H02H 1/0015 361/42 |
| 9,136,688 B2 * | 9/2015 | Laschinski .......... | H02H 1/0015 |
| 2007/0252603 A1 * | 11/2007 | Restrepo .............. | H02H 1/0015 324/536 |

(Continued)

FOREIGN PATENT DOCUMENTS

| | | | |
|---|---|---|---|
| CN | 102231534 B | * | 7/2013 |
| CN | 107916614 A | | 5/2018 |

OTHER PUBLICATIONS

"Detecting harzardous arc faults", *Components in Electronics*, [online]. [retrieved on Dec. 30, 2016-]. Retrieved from the Internet: <URL: http://content.yudu.com/A1tv5e/CIESept2011/resources/26.htm>, (Sep. 2011), 1 pg.

(Continued)

*Primary Examiner* — Michele Fan
(74) *Attorney, Agent, or Firm* — Schwegman Lundberg & Woessner, P.A.

(57) ABSTRACT

Power systems having a DC content, such as photovoltaic (solar) panels present a problem if an arc fault appears because of a small break in a cable. The present disclosure describes an arc fault detection system that captures data in segments, examines the frequency spectrum to remove 'false arc' signatures and interference from a power converter of the power system, and then examines the cleaned frequency spectrum for arc events.

29 Claims, 10 Drawing Sheets

(56) References Cited

U.S. PATENT DOCUMENTS

| | | | |
|---|---|---|---|
| 2008/0024140 A1* | 1/2008 | Henson | H02H 1/0015 |
| | | | 324/536 |
| 2011/0141644 A1* | 6/2011 | Hastings | H01L 31/02021 |
| | | | 361/93.2 |
| 2012/0316804 A1* | 12/2012 | Oberhauser | G01R 31/1227 |
| | | | 702/58 |
| 2013/0094112 A1* | 4/2013 | Burghardt | H01L 31/02021 |
| | | | 361/42 |
| 2014/0067291 A1 | 3/2014 | Balog | |
| 2014/0279576 A1* | 9/2014 | Luke | G06Q 10/30 |
| | | | 705/308 |
| 2014/0340062 A1* | 11/2014 | Jain | H02M 3/156 |
| | | | 323/282 |
| 2017/0025996 A1* | 1/2017 | Cheung | G01R 31/40 |

OTHER PUBLICATIONS

Li, Jing, et al., "Series Arc Fault Studies and Modeling for a DC Distribution System", *2013 IEEE PES Asia-Pacific Power and Energy Engineering Conference (APPEEC)*, (2013), 7 pgs.

Restrepo, Carlos E., et al., "Arc Fault Detection and Discrimination Methods", *2007 Proceedings of the 53rd IEEE Holm Conference on Electrical Contacts*, (2007), 8 pgs.

\* cited by examiner

METHOD OF DETECTING ARC EVENTS IN A POWER SYSTEM, AND A POWER SYSTEM INCLUDING AN ARC DETECTOR

FIELD

The present disclosure relates to a method of detecting arc events in a power system, for example a DC photovoltaic power system, and to a power system including such an arc detector. The teachings herein can be applied to systems having a DC supply.

BACKGROUND

It is known that arc faults can cause system failures, shock hazards and fires in power distribution systems such as photovoltaic (PV) power generation systems and other direct current system such as micro grids.

An arc fault might arise from break or interruption of a cable, for example due to wind damage or thermal cycling in a photovoltaic array. Arcing in the DC side of photovoltaic arrays is particularly problematic as the photovoltaic array will continuously supply current therefore maintaining the arc. It is therefore highly desirable to be able to detect arc faults and take appropriate measures, such as opening switches in the photovoltaic array or in devices connected to the array in order to inhibit the current flow.

Photovoltaic arrays are often associated with switched mode inverters or other switched mode power supplies and as a result the current flow from the PV array can change rapidly due to noise being generated by the switching converter. This makes arc fault detection a difficult task.

SUMMARY

According to a first aspect of the present disclosure there is provided a method of detecting arc fault events in a power supply. The method comprises the steps of analyzing a current flow in the power supply in order to form a frequency domain representation of the current flow occurring over a first time period. The frequency domain representation is then analyzed to remove switching spurs, if any, from the representation. Narrow band spurs are also identified and their influence removed or reduced. The processed frequency domain representation is then examined for arc events.

Removing the influence of the switching spurs may involve applying one or more notch filters centered over the switching spurs in order to attenuate their influence within the frequency domain analysis. The filters may be provided as a comb filter. Additionally or alternatively curve fitting may be applied around a switching spur in order to estimate an idealized shape of the switching spur and then this idealized shape can be used to subtract or at least attenuate the influence of the switching spur within the frequency domain representation.

The method may further include identifying relatively narrow spurs within the frequency domain representation in a subsequent or concurrent processing step. The relatively narrow spurs may result from changes in the load drawn from the switched mode converter, or from operation of a power controller associated with the PV array in order to modify the operation of the switched mode converter to try and maintain efficiency of the PV array, for example when part of the array becomes shaded by a cloud. The position and number of these relatively narrow spurs within the frequency domain are unknown. This can be contrasted with the position and number of switching spurs based on the known switching frequency of the power converter. Having identified the positions of the relatively narrow spurs within the frequency domain representation steps are performed to remove their influence from the frequency domain representation. Such steps may include modelling the shape of the narrow spurs in order to remove their influence from the frequency domain representation, or masking portions of the frequency domain representation to indicate the presence of a narrow spur therein such that data within that region is ignored in subsequent processing steps or replacing the data by a default value, or by dividing the value so as to reduce its influence. Division by powers of two can be performed very rapidly by a shift operation.

Once the frequency domain representation has been processed to remove or at least attenuate the influences of the relatively narrow spurs and any switching spurs therein, the frequency domain representation can then be examined as a whole, or as a plurality of segments, to determine whether an arc fault condition is likely. The step of determining whether an arc fault condition is likely could be performed by summing the value of the frequency domain representation within a window representing a range of frequencies, or from an average value within the window, and then comparing this sample with a threshold value. The threshold value may be a function of the system noise during a non-switching period of the converter.

Alternatively, the noise value may be averaged or assumed, and that value can be removed from the sum or average over the window prior to comparing the sum or average with an arc detection threshold.

Advantageously the current from the PV array is monitored by way of a current transformer or a Rogowski coil in order to provide galvanic isolation between the components performing the arc detection and the output of the photovoltaic array. Furthermore, use of the current transformer or of a Rogowski coil has the effect of removing the DC current flow from the transducer output. This may simplify the design of subsequent analog signal processing circuits, for example by removing the need to handle input signals over a relatively large dynamic range. Other sensors such as hall effect sensors or magneto-resistors may also be used. Furthermore, optical magnetic field sensors (for example using the Faraday effect) may be used.

The switching spurs resulting from operation of an inverter or DC to DC switched mode converter within the power distribution system are relatively wide and can be located by scanning the frequency domain representation for peaks standing above the noise floor, where a peak is greater than a switching spur threshold value and has a width greater than a switching spur width value. The relatively narrow spurs may be identified by locating narrow regions of the frequency domain representation where the value at or around a given frequency exceeds a narrow spur threshold value and the width of the peak is less than a narrow spur frequency range value.

According to a second aspect of the present disclosure there is provided an arc detector for a power supply or distribution system, the arc detector including a data processor arranged to:
perform arc detection by analyzing a current flow in a power supply or distribution system to form a frequency domain representation of the current flow;
to identify switching spurs in the frequency domain representation and to remove their influence from the frequency domain representation;

to identify relatively narrow spurs in the frequency domain representation and to remove their influence from the frequency domain representation; and to form a sum or average or other function of sample values of the frequency domain representation over a window within the frequency domain representation and to determine the existence of an arc if the sum or average exceeds an arc detection threshold value or the other function falls within an arc detection range.

According to a further aspect of the present disclosure there is provided a power supply or a power distribution system including an arc detector according to the second aspect of the present disclosure.

BRIEF DESCRIPTION OF THE DRAWINGS

Examples of embodiments of a method and apparatus in accordance with the teachings of this disclosure will now be disclosed, by way of non-limiting example only, with reference to the accompanying Figures, in which.

DESCRIPTION OF SOME EMBODIMENTS OF THE DISCLOSURE

Figure 1:
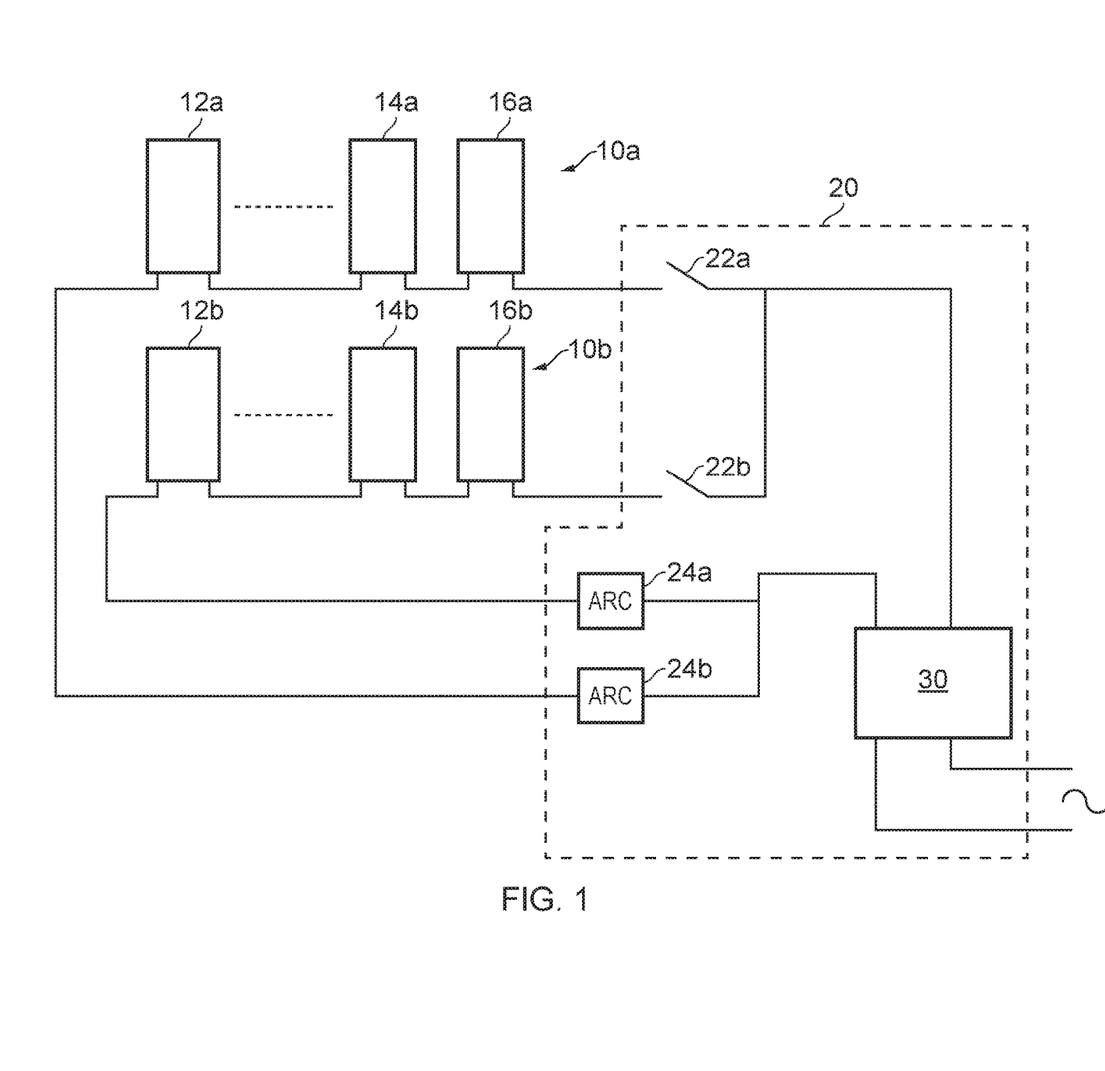
FIG. 1 schematically illustrates a photovoltaic array together with components of an associated power distribution system.

FIG. 1 schematically illustrates a photovoltaic array. The array may comprise a plurality of banks of solar panels. In FIG. 1 two banks of panels are shown, generally designated 10a and 10b. Each bank comprises a plurality of solar panels arranged in series. The bank 10a comprises the panels 12a, 14a and 16a. Although only three solar panels have been shown, it is to be understood that the bank will generally comprise more than three panels. Similarly the second bank 10b comprises a plurality of solar panels of which panels 12b, 14b and 16b are illustrated. Where, for example, 12 panels are connected in series the maximum open circuit DC output voltage from the string of panels may be in the order of 600 volts. As current is drawn from the panels the voltage across the array of panels may reduce, and a power converter 20 typically acts to control the current so as to move the panels towards a maximum power point where the panels are most efficient (this function is provided by a maximum power point tracker, MPPT). The power converter may also implement some system protection features. In the example shown in FIG. 1 the power converter generally indicated 20 and delimited by the chain line in FIG. 1, comprises fuses or circuit breakers 22a and 22b which are operable to isolate each one of the banks of panels 10a and 10b. The power controller further comprises arc detectors 24a and 24b associated with respective ones of the banks of panels 10a and 10b in order to detect an arc fault within the associated banks of panels. The current outputs from the banks of panels 10a and 10b are combined and provided to a shared inverter 30. Such an arrangement is known from the prior art, for example from the paper "Detecting Hazardous Arc Faults published in September 2011 and available at http:\\content.vudu.com\A1tv5eCIESept2011\resources\ 26.htm.

Figure 2:
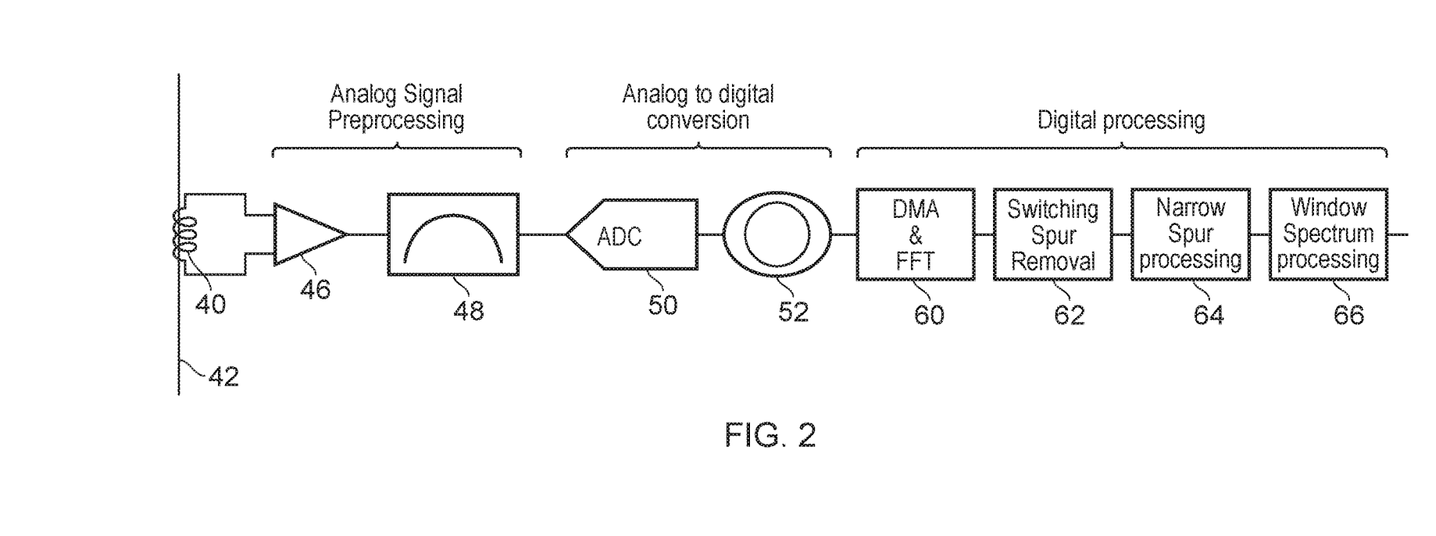
FIG. 2 schematically illustrates an arc detection system constituting an embodiment of the present disclosure.

FIG. 2 illustrates an arc fault detector constituting an embodiment of the present disclosure. The arc fault detector comprises an inductive current sensor, such as a Rogowski coil 40 which monitors the current flow in power cable 42. The outputs of the Rogowski coil 40 are provided to an analog signal preprocessing block comprising an input amplifier 46 which provides an initial gain to the output from the Rogowski coil 40. The output of the amplifier 46 is then provided to a bandpass filter 48 which limits the frequency spectrum of the signal output by the signal preprocessing block. In this example, the bandpass filter removes DC components and components below 2 KHz and acts to filter out components above 200 KHz. However it is to be noted that the system designer is able to choose other band pass ranges for the filter without departing from the teachings of this disclosure. An output from the analog signal preprocessing block is provided to an analog to digital converter 50 whose digital output is provided to a circular buffer (also known as a ring buffer 52). The use of a circular buffer means that the analog to digital converter 50 can keep providing samples at its designated sample rate with the assurance that none of the samples will have been missed when data is truncated into blocks for digital processing in order to detect the arc faults. Digital processing is performed by a digital processing block, which will be described in greater detail later.

Although a Rogowski coil has been discussed in this example other current sensors may be used. Non-contacting (in the sense that they do not touch the copper of the wire 42) sensors such as current transformers, hall sensors, magneto-resistive and magneto-optical sensors may also be used.

Additionally shunt style sensors may also be used. For example a voltage drop across a low resistance shunt, or across the current interrupter (e.g. a fuse or a circuit breaker), may be used as an input for the arc detector.

Figure 3:
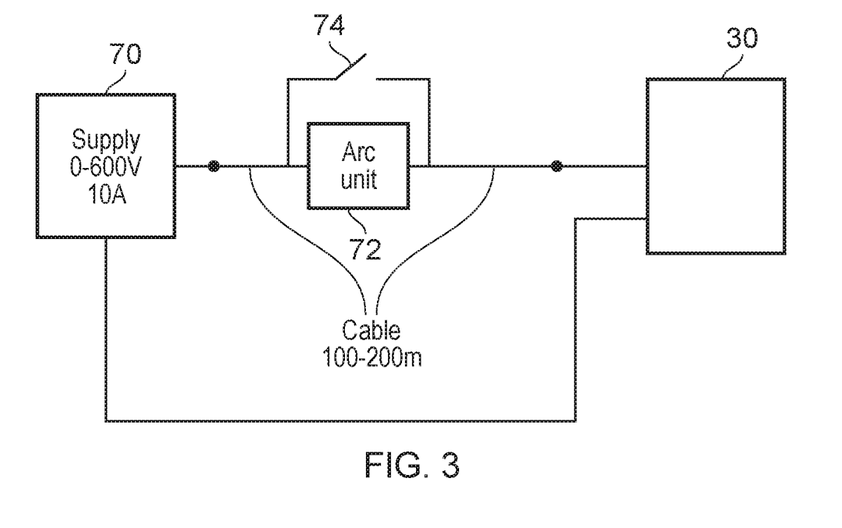
FIG. 3 schematically illustrates a test circuit used to induce arc faults for the purposes of developing and testing the performance of the arc fault detector described herein.

In order to reliably induce and test the properties of arc faults, a test arrangement shown in FIG. 3 was used. A cable having a length of 100 to 200 meters was run between a power supply 70 capable of supplying up to 600 volts at 10 amps, and which represents the photovoltaic panels, and an inverter 30 as would be found in the arrangement shown in FIG. 1. An arc generation unit 72 comprises first and second conductors having a gap there between, where the gap width can be tightly controlled. The arc generator unit 72 is in parallel with a bypass switch 74 and the switch and the generator unit combination can be placed at any point within the cable run between the supply 70 and the inverter 30. Opening the switch 74 has the effect of placing the arc unit 72 in series with the cable, thereby simulating the arc fault. This is in accordance with the UL 1998 standard.

Returning to FIG. 2, the current flowing through the cable 42 is detected by the Rogowski coil, amplified and filtered and that signal is provided to the analog to digital converter 50. The converter 50 is a high speed high precision converter capable of achieving conversion rates in excess of 500 kilo-samples per second, and preferably at rates in excess of 1M samples per second at an effective resolution compared to the noise floor of at least 14 bits and preferably is a 16 bit or more converter. For the purposes of providing the analog to digital conversion and digital processing in a single unit, the Analog Devices CM403 mixed signal processor was used. This part comprises two high precision 16 bit analog to digital converters having a conversion time of 380 ns, operated to provide several channels, each of which provided 1024 samples taken every 2 ms. The samples were written into the integrated circular buffer and extracted one block of 1024 samples at a time for processing by the high precision floating arithmetic core provided within the CM403 chip. Other mixed signal conversion and data processing components are known within the Analog Devices family of chips. Each of the analog to digital converters within the CM403 has its own multiplexer such that each can access one of 16 channels, and can deliver 16 channels of ADC data in memory in 3 µs. In the unit under evaluation, contiguous blocks of 1024 samples, each representing contiguous 2 ms time frames were processed in real time. Each block of data was provided to an FFT engine/function which derived a spectral density map over the frequency range of interest. In this example the FFT is operable to provide 1024 FFT bins spanning a range 0 to 200 KHz. Consequently each bin has a width of about 197 Hz.

Figure 4:
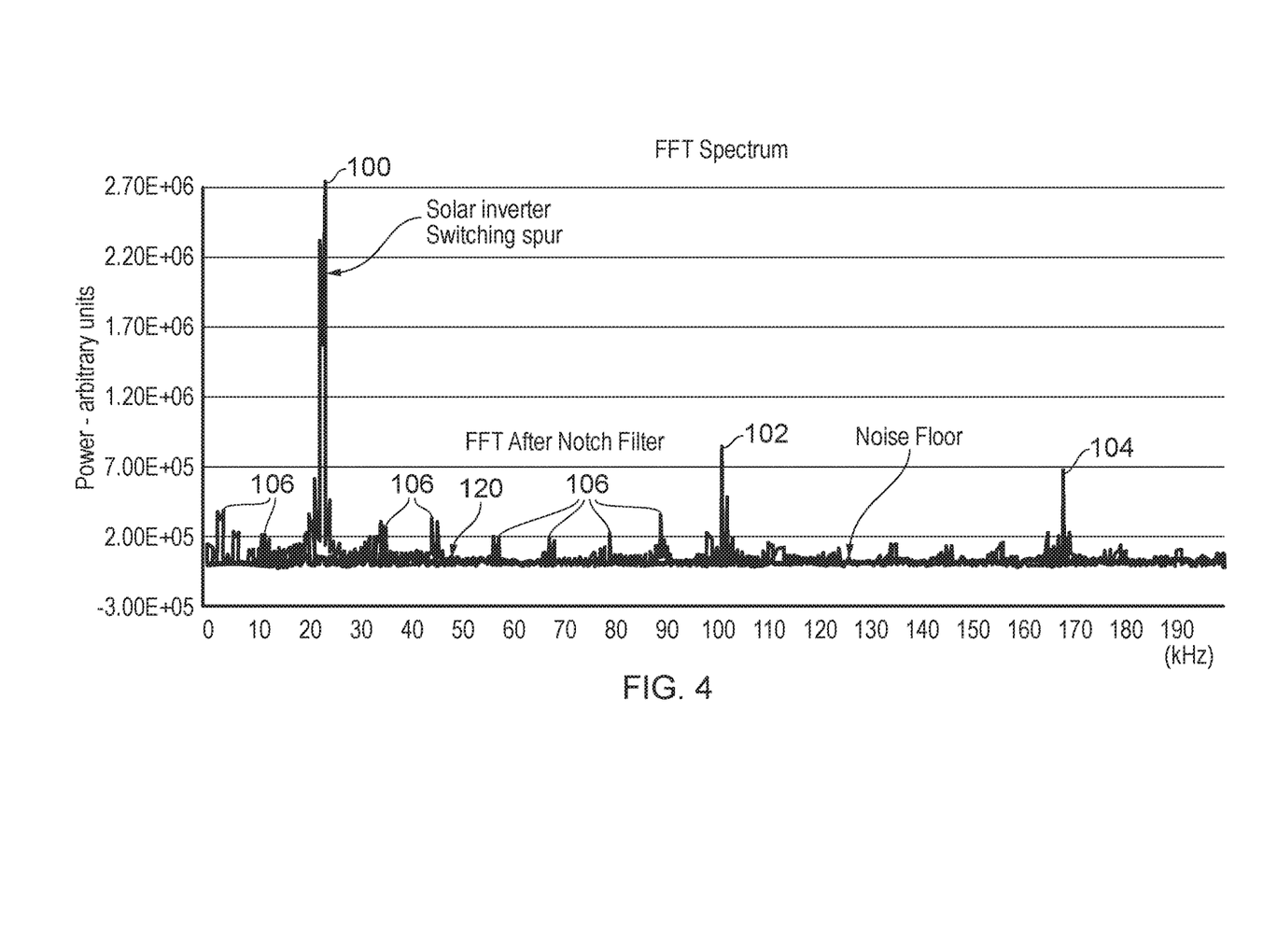
FIG. 4 is a power spectral density diagram showing noise power versus frequency for AC components of the current flow from the photovoltaic panels in the system of FIG. 1.

FIG. 4 shows the FFT output, expressed in KHz, and with an arbitrary power scale. It can be seen that there are several large spurs in the power spectral density plot. The most significant spur, designated 100, occurs at around 22 KHz and this represents the interference introduced by the switching frequency of the inverter 30. Thus, it can be seen that transistors within the inverter, for example within the load controller or a primary DC to DC stage are operating at a switching rate of about 22 KHz. Given that the transistors switch on and off in an abrupt manner, then it would be expected, as is the case, that harmonic components occur at the third, fifth, seventh harmonic and so on. Thus as can be seen a significant harmonic component designated 102 occurs at around 100 KHz and another significant component designated 104 occurs at around 166 KHz. Furthermore, intermodulation distortion and mixing between these harmonic components gives rise to other significant switching frequency spurs generally designed 106.

Returning to FIG. 2, the first digital processing step is performed at processing unit 62 in order to remove the switching spurs. These can either be estimated based on knowledge of the transistor switching frequency, or a peak detection algorithm can scan the FFT bins in order to identify the switching spurs. The switching spurs are relatively easy identifiable because they tend to be large and they tend to be relatively wide, having a width of several KHz as shown here, which exhibits itself as a peak which grows and then falls across several, e.g. 20 or more, FFT bins.

Once the locations of the switching spurs have been identified, each one of them can be processed to remove its influence. Thus, a notch filter may be digitally applied at the estimated center frequency of each switching spur. The depth of the notch and the width of the notch can be digitally controlled, and each of these values may be predetermined or selected by an operator during set up. As a further alternative a curve fitting algorithm may be applied over each spur in order to provide a fit to each of the switching spurs, and then the algorithm may be used to generate an idealized curve response which is then subtracted from the data across the various bins in order to remove the influence of the switching spurs. The spectral data as cleaned by the removal of the switching spurs is represented in FIG. 4 by line 120.

Figure 5:
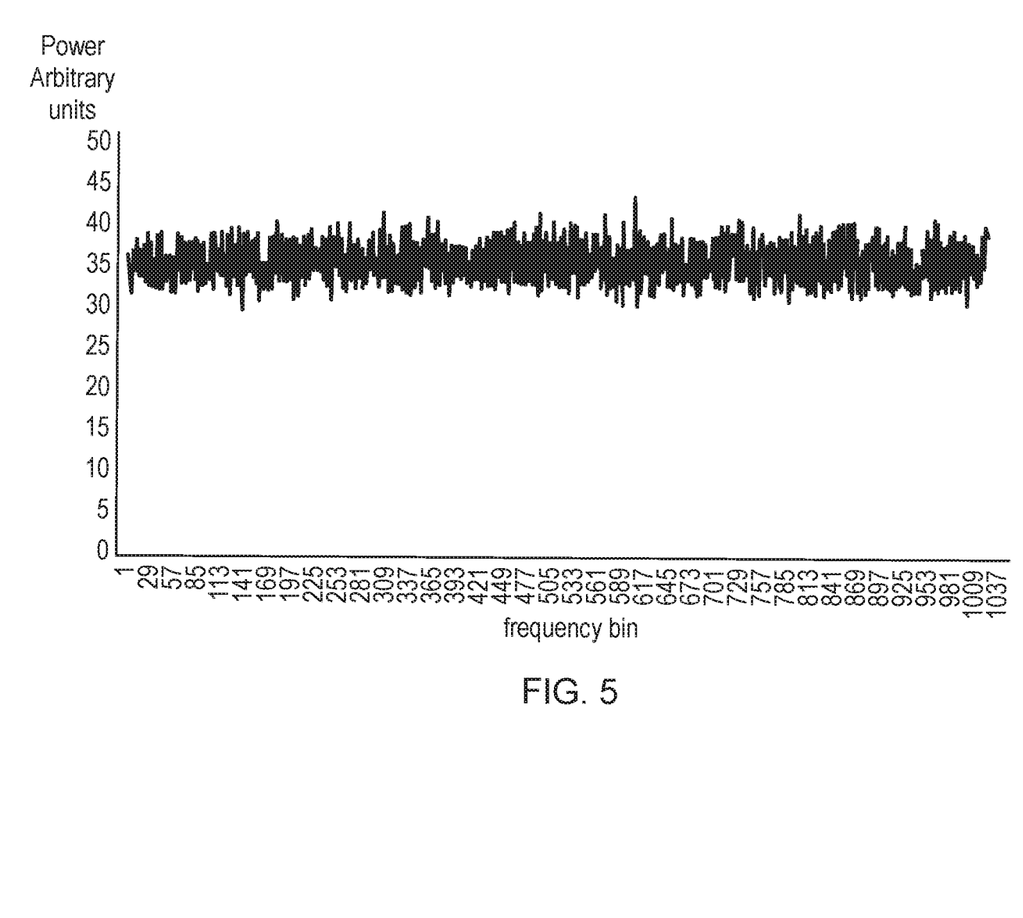
FIG. 5 is a plot of the spectral density of the system noise floor taken when the power converter of the photovoltaic array is inoperative.

In the next step, as represented by box 64 of FIG. 2, a further sweep through the data is made to identify "false arcs" these are narrow frequency tones within the power spectral density plot which extend significantly above the noise floor and whose frequency content may be distributed in a few of the FFT bins. These narrow frequency tones, as noted before, typically only a few 100 Hz wide and hence having a width typically less than 10% of the width of a switching tone, and often less than 5% of the width of the switching tone can result from load noise being propagated back through the inverter or from the operation of the power controller modifying the switching time within the switching cycle of the transistors of the inverter so as to try and hold the efficiency of the photovoltaic cells as high as reasonably possible. These narrow tones or false arcs can be identified as noted before, because they have narrow power frequency extent in the power spectral density map significantly in excess of the noise floor. One approach, and indeed the favored one, is to characterize the noise floor of the system during switch on by collecting samples when the inverter is not running, and hence no current should be drawn from the solar panels. Thus, in effect, a power spectral density relating to the operation of the amplifier 46, filter 48, analog to digital converter 50 plus the influences of any local noise can be determined. Data collected during this time can then be subjected to a Fourier transform to create a reference power spectral density, as shown in FIG. 5, which represents the noise as a function of frequency. In FIG. 5, the noise has been allocated to each one of the frequency bins of the FFT. It can be seen that the level is typically in the order of 35 to 40 arbitrary units of the scale shown in the figures.

Additionally or alternatively the noise floor may be estimated or re-estimated from the power spectral density data collected when the inverter is running and hence current may be being drawn from the solar panels. Thus, in effect, a spectrum relating to the operation of the amplifier 46, filter 48, analog to digital converter 50 plus the influences of any local noise can be determined. Data collected during this time can then be subjected to a Fourier transform. The noise floor can be estimated by identifying areas of the power spectrum where no spurs exist and averaging the FFT bins in these spur free regions.

Figure 6:
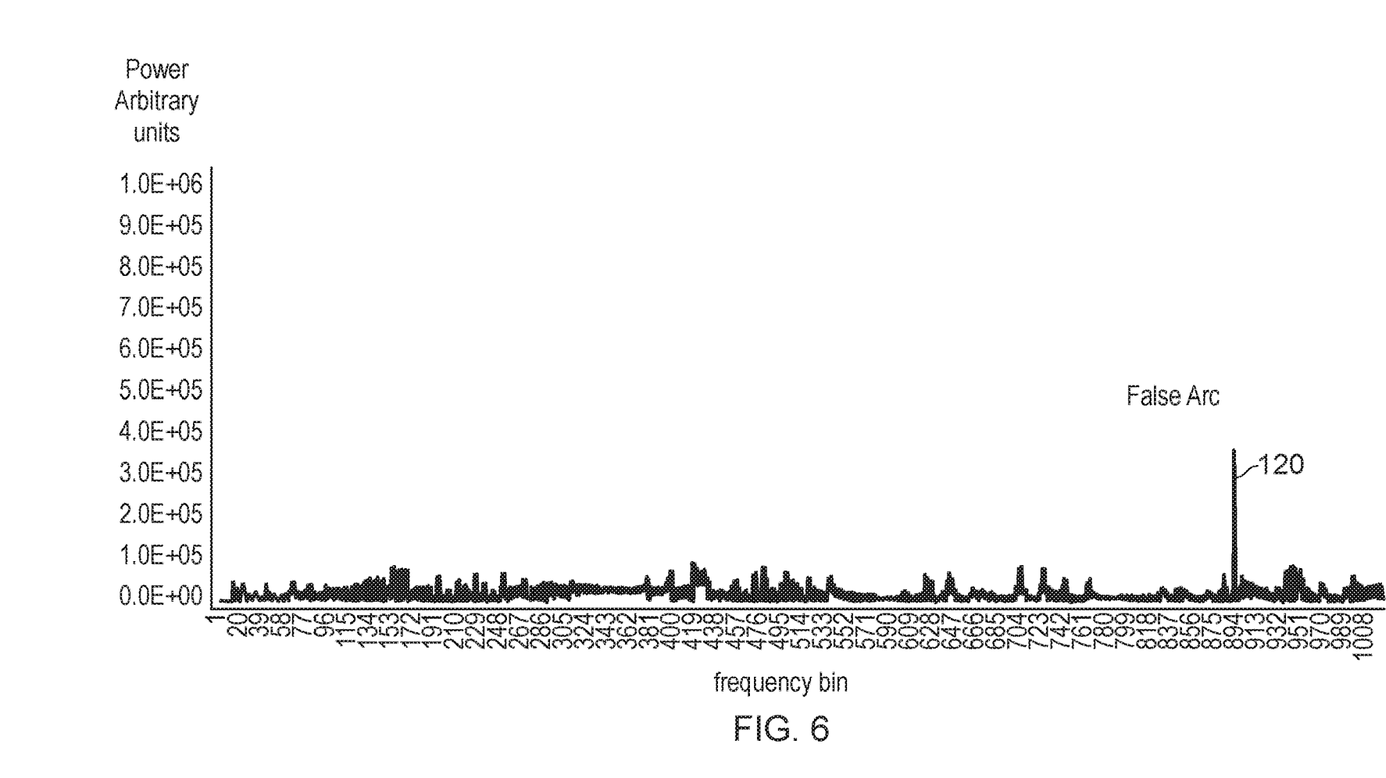
FIG. 6 is a plot of spectral power density where the switching arcs have been removed, for the purposes of clarity of the diagram, but a false arc remains as indicated by a relatively narrow frequency spur.

FIG. 6 shows a frequency spectrum where a 'false arc' is known to exist, since the test equipment allowed the inventor to ensure that no real arc existed. The false arc in this spectrum is designated 120 and was located at FFT bin 894, which corresponds to a frequency of 200 KHz×894/1024=178.8 KHz. In this example the false arc was only located in one bin, but had its frequency content been close to a bin boundary, then the false arc could have shown up in two of the FFT bins. However it does not show up in any of the other FFT bins, and consequently presents itself as one bin or two bins having an FFT value significantly higher than the surrounding bins. These events are relatively easy to search for by a suitably programmed data processor. Once a false arc has been identified, then either a mask can be set for that bin or pair of bins such that it or they cannot be used in further processing, or the value in the bin can be overwritten, either with a "0" or a number representative of the noise floor that bin has determined during the noise floor analysis phase as represented in FIG. 5.

The system provides an interface, such as a GUI, which allows the system designer or user to vary the threshold which is used to indicate the presence of a false arc. Once a tone exceeds a threshold, a further variable, which can be regarded as a tone elimination variable, can be used to set a degree to which the tone is suppressed from the data. Tone elimination can be regarded as applying a notch filter around each tone, such as the switching tones or the false arc tones once identified by the system. The depth and width of the filter is controllable by the user.

Figure 7:
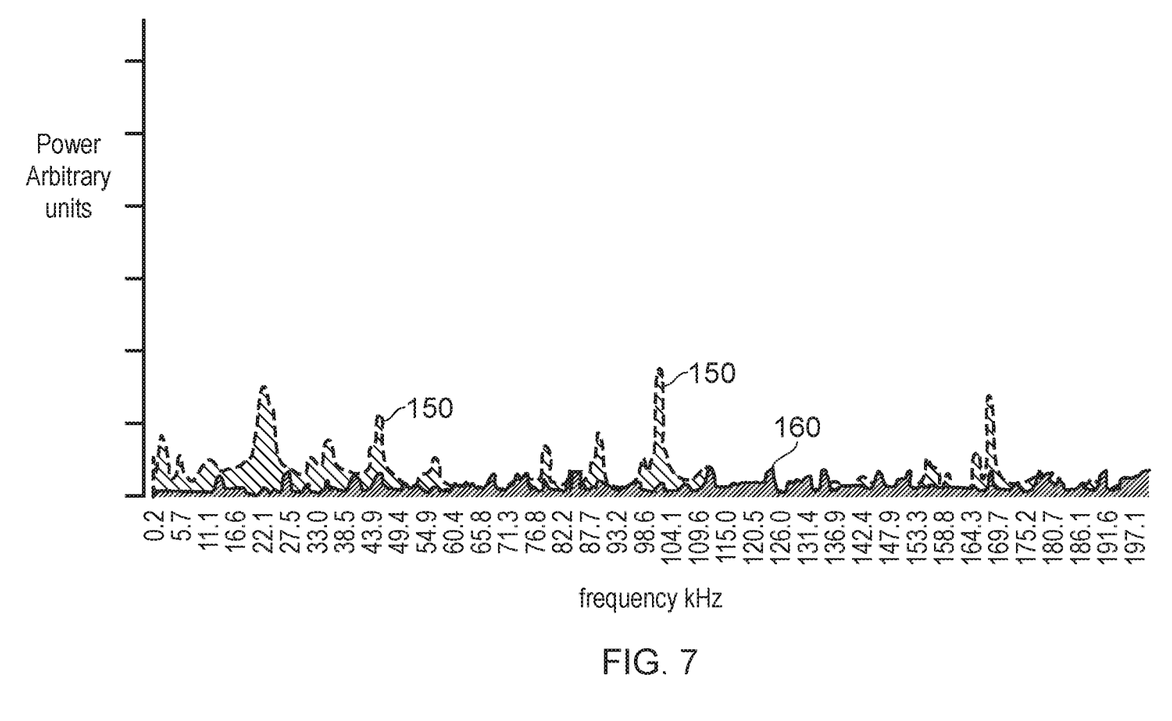
FIG. 7 is a plot of the power spectral density after removal of the switching spurs and false spurs.

FIG. 7 represents the data of FIG. 4 after arc detection and elimination steps have been applied at step 64 and the spurs have been removed at step 62 of FIG. 2. It can be seen that the spectrum of false arcs, generally indicated 150 can be processed to a much more contained spectrum level generally indicated 160 where false arc components have been removed. This clean spectrum 160 may now be examined to identify the presence of actual (real) arcing events. An actual arc event tends to have frequency components across wide ranges of the frequency spectrum. Thus a range of frequencies, i.e. a range of bins may have their values summed or averaged, and that value can then be compared with a threshold value to determine whether or not an arc is likely. This threshold value can be set based on knowledge of the system noise floor. Thus, noisier systems would tend to have higher threshold values than generally quiet systems. Averaging and thresholding could be performed across the entire range of FFT bins, up to 1024 in this example, but ignoring any FFT bins which have been masked. The average can then be compared with the threshold. However, because the arc may have its peak power located across a relatively narrow range, it is potentially easier for a search algorithm to subdivide the frequency spectrum into a plurality of windows, each window may span a range of tens or hundreds of FFT bins, and to generate the sum or average across each window, and then compare the average with the threshold for each window. This has the advantage that if the arc power is constrained to lie within a relatively small frequency band, then it will still appear significant within one of the windows, whereas the arc power may appear less significant when smeared out over the entire frequency range.

Figure 8:
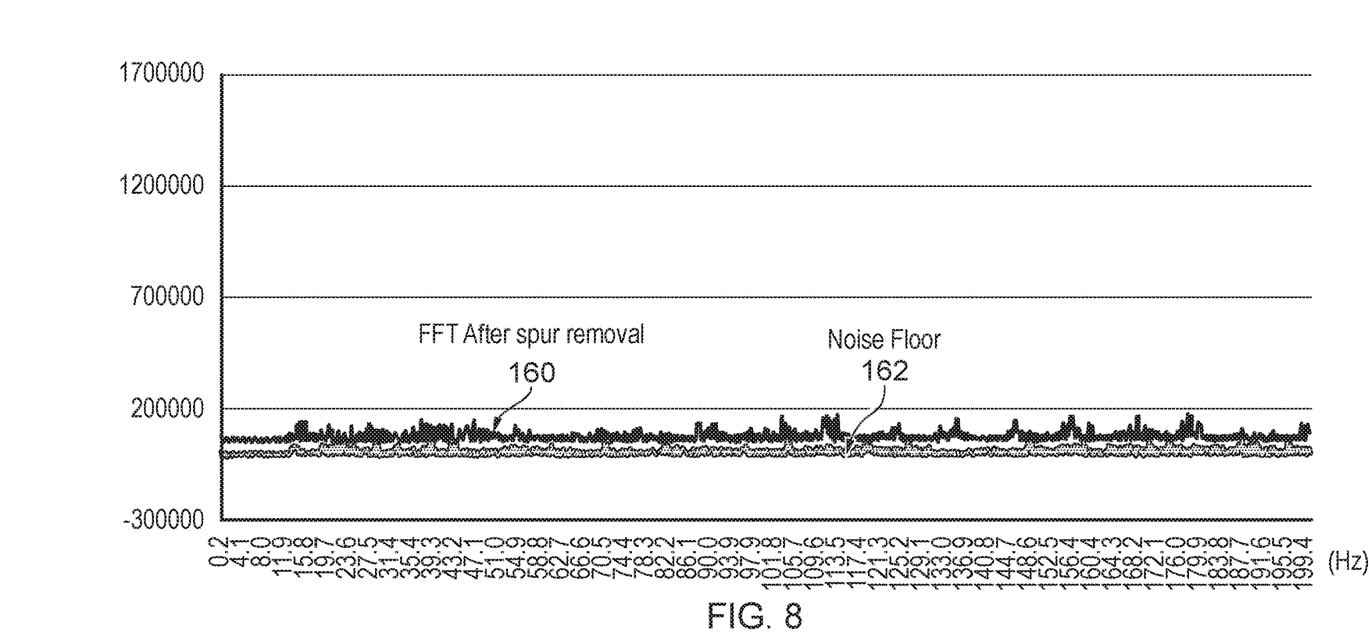
FIG. 8 is a graph showing an example of the cleaned frequency data in comparison to an example of the noise floor.

FIG. 8 illustrates an example of the cleaned frequency domain data 160 together with a plot of noise floor data 162 from a system that was used during test and evaluation by the inventor.

Figure 9:
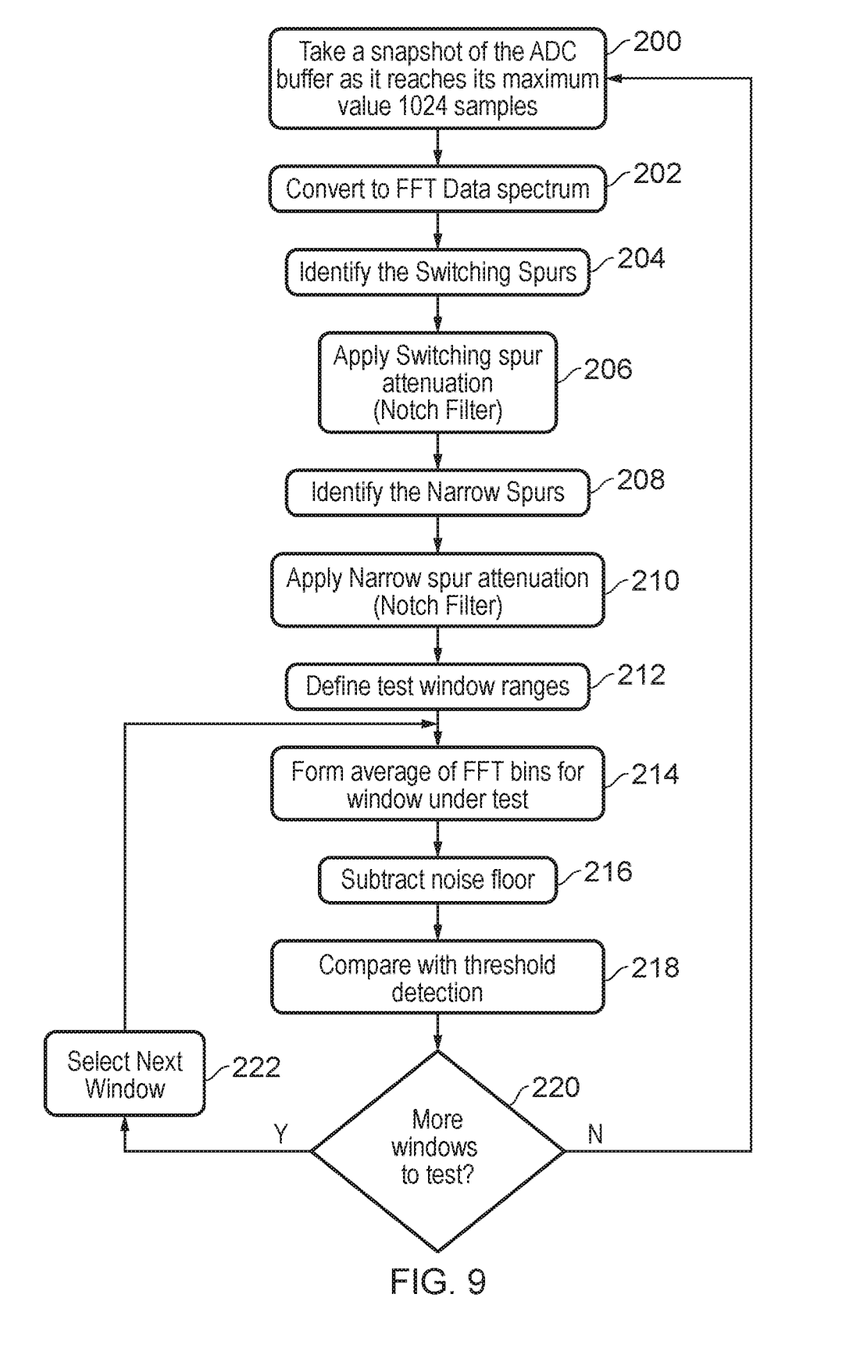
FIG. 9 is a flow chart setting out one example of the steps used in the method described herein.

For completeness, FIG. 9 sets out a flow chart describing the processing steps which have been alluded to hereinbefore. The process starts at step 200 where a chunk of data is removed from the circular buffer. A tradeoff has been made between the time frame over which the data spans and the responsiveness of the system. Taking the data over a longer period would reduce the noise floor and increase the FFT resolution, but might mean that arc faults exist for an unacceptably long period of time before being detected. Thus, in the present embodiment, the data spans a range corresponding to a period of 2 ms. However time shorter ranges may be used, especially with higher speed ADCs. However it is doubted that one would wish to average the data over a time period exceeding 10 ms or so. From step 200 the data is subjected to a Fourier transform at step 202. The switching spurs are then identified at step 204, which involves looking for relatively wide significant peaks. Once the spur locations have been found a comb filter may be applied to the data with a notch centered on each one of the switching spurs so as to attenuate it. The depth and width of the notch applied to each one of the spurs can be set by a user. After the switching spurs have been attenuated in step 206, a second pass is made through the data to identify narrow spurs, as exemplified by a single bin, or adjacent pair of bins having FFT values in them which are significantly above the values of the surrounding bins or the noise floor. Once the narrow spurs have been identified at step 208 the spurs can be attenuated at step 210. Such attenuation might typically be in the form of overwriting the bin data with a zero or with the previously recorded noise value for that bin. Control then passes to step 212 where the FFT bins are subdivided into groups, each group corresponding to a frequency test window range. From here, for each window, an average is formed over the window at step 214, control may then optionally be passed to step 216 where the noise floor may be subtracted, and then the data from step 214 (or step 216 if it was performed) is compared with the detection threshold at step 218 and a flag set to indicate the presence of an arc if appropriate, or that an arc has not been found. From step 218 control is passed to step 220 where a test is made to see if there are further test window ranges to be analyzed. If further windows exist, then control is passed to step 222 which selects the next window for analysis and then control is returned to step 214. If however step 220 determines that all of the windows have been analyzed then the data processing for that batch of data is complete and control is returned to step 200 such that the next block of data can be removed from the circular buffer 52.

The process described above for steps 210 onward will be discussed in more detail with respect to FIG. 10.

The sampled data from the circular buffer is represented by the triangular symbols 250. Each symbol represents the data associated with an individual are of the FFT bins, of which bins 800 to 871 are shown in this example.

Suppose that false arcs have been identified for bins 807, 808, 823, 844 and 845 as designated by symbols 260. These values have been flagged such that their contribution to the data set will be ignored in this example.

Figure 10:
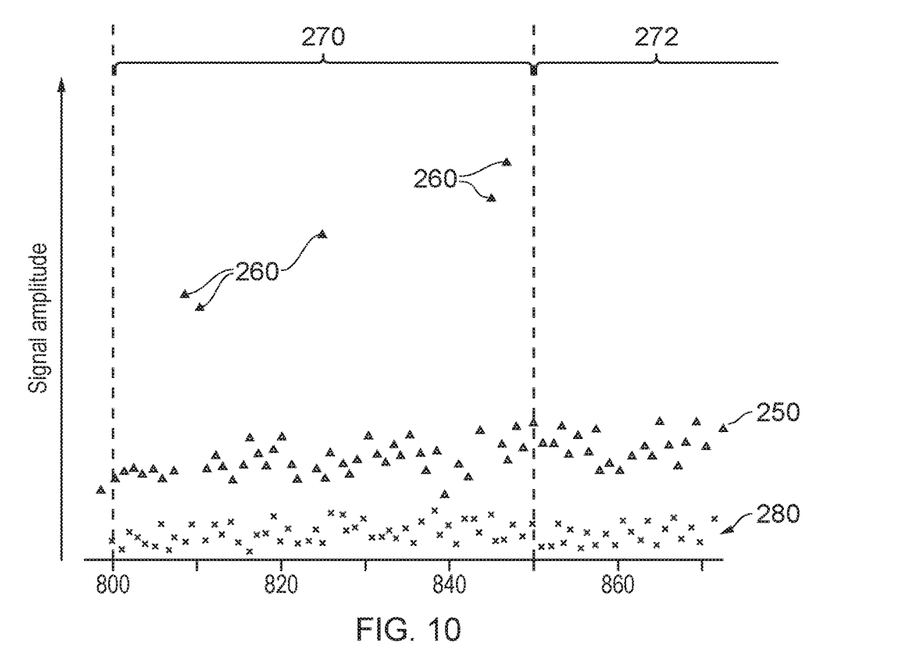
FIG. 10 is a chart showing power distribution within a window of the FFT bins.

At step 212, a plurality of test windows were defined, one of which 270 extending from bin 800 to 849 is shown in FIG. 10, where a subsequent window 272 would span the range of bins 850 to 899. It should be noted that the window size need not be 50 bins and other window sizes can be chosen.

Step 214 then forms an average of the signal amplitudes. In window 270 this average comprises bins 800 to 806, 809 to 822, 824 to 843 and 846 to 849, i.e. bins 807, 808, 823, 844 and 845 are excluded from the calculation of the average because they are deemed to contain false arc signals.

The value of average signal size in the window is compared with the average noise floor value in the window, formed by averaging the bin values 280 when the inverter was not running, and then the averages are compared, and the difference or the ratio (as appropriate) used to determine the presence or absence of arcing.

Some computational saving may be made by tracking the movement of some of the switching spurs and using this to estimate the positions of other switching spurs. However, this may inadvertently carry errors forward between subsequent estimates of spur positions and analysis of arc events.

In embodiments of the present disclosure each capture and analysis is performed without reference to a preceding one, thereby ensuring that the switching spur positions are updated afresh at each data capture.

In tests, the system described herein gave significant improvements over prior art systems because of its ability to detect and remove the relatively narrow tones in the power spectral density representation. Relatively narrow tones as used herein refer to those tones that either have a bandwidth of less than 10% of the converter switching spur widths, or which have a spectrum of less than 400 Hz, and often less than 200 Hz in width.

The ability to provide real time processing of data to analyze a frequency spectrum of substantially 200 KHz width with a resolution of around 200 Hz provides enhanced arc detection performance compared with prior art methods. Indeed, prior art methods such as that described in US 2014/0067291 teaches away from the use of current monitoring and instead proposes voltage monitoring using waves that transforms because, voltage wave forms include more information than current waveforms, as set out at paragraph 36 of that document.

Where the claims are presented in single dependency format (as suitable for use for filing at the USPTO) it is nevertheless to be understood that each claim may depend on any preceding claim of the same type (i.e. apparatus or method) except where such dependency is clearly technically infeasible.

The invention claimed is:

1. A method of using a data processor for detecting arc events in a photovoltaic system having a switched mode converter therein, the method comprising:
   analysing a current flow in the system to form a frequency domain representation based upon the current flow;
   identifying one or more relatively narrow spurs in the frequency domain representation, wherein the one or more relatively narrow spurs include one or more inverter switching spurs respectively having a frequency width of less than 400 Hz;
   modifying the frequency domain representation including applying one or more notch filters respectively centered over the respective one or more inverter switching spurs so as to remove influence of the one or more inverter switching spurs;
   processing resulting sample values over a window within the frequency domain representation in which the influence of the one or more inverter switching spurs has been removed, and determining existence of an arc if the result of the processing falls in a range of values indicative of the existence of the arc, the range of values indicative of the existence of the arc being determined using the frequency range representation excluding the one or more relatively narrow spurs or after the removing of the influence of the one or more inverter switching spurs; and
   generating an adjustment to at least one of one or more switches in the photovoltaic system or one or more devices coupled to the photovoltaic system to inhibit the current flow based on determining the existence of the arc.

2. A method as claimed in claim 1, in which the current flow through a conductor is sampled in the time domain to form one or more sample sets.

3. A method as claimed in claim 1, in which the current flow is sampled by an inductively coupled current sampling device so as to remove a DC component.

4. A method as claimed in claim 1, in which the step of analysing the current flow includes performing a time domain to frequency domain conversion.

5. A method as claimed in claim 1, in which the step of identifying one or more relatively narrow spurs in the frequency domain representation of the current flow includes looking for switching spurs by identifying one or more peaks whose width exceeds a switching spur identification threshold.

6. A method as claimed in claim 1, in which the step of identifying one or more relatively narrow spurs in the frequency domain representation of the current flow includes receiving switch frequency data representative of at least one transistor switch within the switched mode converter and using the switch frequency data to mask or remove additional data from a plurality of regions in the frequency domain representation which are centered around a plurality of interference frequencies which are at a corresponding plurality of predetermined multiples of at least one switch frequency.

7. A method as claimed in claim 1, in which the step of identifying one or more relatively narrow spurs comprises identifying one or more frequency components of a width which is less than 10% of the width of a switching spur.

8. A method as claimed in claim 7, in which the step of modifying the frequency domain representation involves one or more of:
   a) fitting a curve to the spur to estimate noise power at various frequencies as a result of the one or more relatively narrow spurs, and subtracting corresponding values from corresponding estimates of noise power in the frequency domain analysis;
   b) masking the frequencies covered by the one or more relatively narrow spurs from being used in further analysis steps;
   c) overwriting data in a region of the one or more relatively narrow spurs with a value or processing the data to reduce its value.

9. A method as claimed in claim 1, in which the step of processing the sample values comprises forming a sum or an average of sample values over a window within the frequency domain.

10. A method as claimed in claim 1, in which the step of processing the sample values further includes the step of applying a compensation based on an estimate of an average noise power within the window or setting a threshold based upon knowledge of the average noise power.

11. The method of claim 1, wherein processing resulting sample values over a window within the frequency domain representation, and determining the existence of the arc if the result of the processing falls in the range of values indicative of the existence of the arc comprises comparing a power distribution average with a threshold value to indicate the presence or absence of the arc event.

12. A method of using a data processor for detecting arc events in a power system, the method comprising:
   performing a frequency domain analysis to identify system operation components in a frequency range under investigation;
   analysing a frequency distribution across the frequency range under investigation where the frequency distribution is modified so as to remove influence of one or more relatively narrow spurs including one or more inverter switching spurs having a frequency width of less than 400 Hz by applying one or more notch filters respectively centered over the respective one or more inverter switching spurs;
   comparing an attribute of the frequency distribution with a threshold value to indicate presence or absence of an arc event; and
   generating an adjustment to at least one of one or more switches in the power system or one or more devices coupled to the power system to inhibit current flow based on the indication of the presence or absence of the arc event.

13. The method of claim 12 further comprising analysing a current flow in the power system to form a frequency domain representation based upon the current flow, wherein the frequency domain analysis is performed based on the frequency domain representation.

14. The method of claim 13 wherein identifying system operation components comprises identifying the one or more relatively narrow spurs in the frequency domain representation.

15. The method of claim 13 further comprising processing resulting sample values over a window within the frequency domain representation in which the influence of the one or more relatively narrow spurs has been removed, and determining existence of an arc if the result of the processing falls in a range of values indicative of the existence of the arc.

16. The method of claim 12 further comprising receiving switch frequency data representative of at least one transistor switch within the power system and using the switch frequency data to mask or remove additional data from a plurality of regions in the frequency distribution which are centered around a plurality of interference frequencies which are at a corresponding plurality of predetermined multiples of at least one switch frequency.

17. An arc detector for a power distribution system, the arc detector including a data processor arranged to perform arc detection by:
analysing a current flow in the power distribution system to form frequency domain representation based upon the current flow;
identifying one or more system operation components iii the frequency domain representation;
modifying the frequency domain representation so as to remove influence of the system operation components including one or more inverter switching spurs respectively having a frequency width of less than 400 Hz;
processing resulting sample values over a window within the frequency domain representation in which the influence of the system operation components including the one or more inverter switching spurs has been removed by applying one or more notch filters respectively centered over the respective one or more inverter switching spurs, and determining existence of an arc if the result of the processing falls in a range of values indicative of the existence of the arc, the range of values indicative of the existence of the arc being determined using the frequency range representation in which the influence of the system operation components including the one or more inverter switching spurs has been removed; and
generating an adjustment to at least one of one or more switches in the power distribution system or one or more devices coupled to the power distribution system to inhibit the current flow based on determining the existence of the arc.

18. The arc detector of claim 17, wherein the arc detector is coupled to the power distribution system.

19. The arc detector of claim 18, wherein the power distribution system comprises a plurality of photovoltaic panels and a switched mode power converter for transforming an output from at least one of the photovoltaic panels to either a regulated DC voltage, a link voltage, or a regulated AC voltage.

20. The arc detector of claim 18, wherein the power distribution system further comprises one or more of a current transformer, a Rogowski coil, a hall effect sensor, or a magneto-resistive element for measuring current flow.

21. The arc detector of claim 17, wherein the arc detector further comprises an analog to digital converter (ADC) having an effective resolution of 14 bits or more compared to the system noise floor and a sample rate of at least 500,000 samples per second.

22. The arc detector of claim 21, wherein the analog to digital converter has one or more of:
a. 16 bit or greater resolution; and
b. a sample rate of 1 million or more samples per second in a single channel.

23. The arc detector of claim 21, wherein the samples are read into a buffer and blocks of samples are removed from the buffer for analysis, wherein a block comprises at least 1000 samples and spans a time period of less than 3 ms.

24. The arc detector of claim 21, wherein data presented by the ADC for processing comprises a string of sample values without missing samples between blocks.

25. The arc detector of claim 21, wherein the arc detector operates in real time, with a processing delay of less than 4 ms.

26. A system comprising:
an arc detector including a data processor configured to:
perform a frequency domain analysis to identify system operation components in a frequency range under investigation;
analyze a frequency distribution across the frequency range under investigation where the frequency distribution is modified so as to remove influence of one or more relatively narrow spurs including one or more inverter switching spurs having a frequency width of less than 400 Hz by applying one or more notch filters respectively centered over the respective one or more inverter switching spurs;
compare an attribute of the frequency distribution with a threshold value to indicate presence or absence of an arc event; and
generate an adjustment to at least one of one or more switches in a power system or one or more devices coupled to the power system to inhibit current flow based on the indication of the presence or absence of the arc event.

27. The system of claim 26, wherein the data processor is further configured to analyze a current flow in the power system to form a frequency domain representation based upon the current flow, wherein the frequency domain analysis is performed based on the frequency domain representation.

28. The system of claim 26, wherein the data processor is further configured to:
identify system operation components by identifying the one or more relatively narrow spurs in the frequency domain representation; and
process resulting sample values over a window within the frequency domain representation in which the influence of the one or more relatively narrow spurs has been removed, and determining existence of an arc if the result of the processing falls in a range of values indicative of the existence of the arc.

29. The system of claim 26, wherein the data processor is further configured to receive switch frequency data representative of at least one transistor switch within the power system and use the switch frequency data to mask or remove additional data from a plurality of regions in the frequency distribution which are centered around a plurality of interference frequencies which are at a corresponding plurality of predetermined multiples of at least one switch frequency.

* * * * *

UNITED STATES PATENT AND TRADEMARK OFFICE
CERTIFICATE OF CORRECTION

PATENT NO. : 10,374,409 B2
APPLICATION NO. : 15/397389
DATED : August 6, 2019
INVENTOR(S) : Martin Murnane It is certified that error appears in the above-identified patent and that said Letters Patent is hereby corrected as shown below:

On the Title Page

Item (56), in Column 2, under "Other Publications", Line 1, delete "harzardous" and insert --hazardous-- therefor

In the Claims

In Column 11, Line 24, in Claim 17, after "form", insert --a--

In Column 11, Line 26, in Claim 17, delete "iii" and insert --in-- therefor

In Column 12, Line 45, in Claim 28, delete "26," and insert --27,-- therefor

Signed and Sealed this
Fourteenth Day of April, 2020

Andrei Iancu
*Director of the United States Patent and Trademark Office*